Patented Jan. 20, 1953

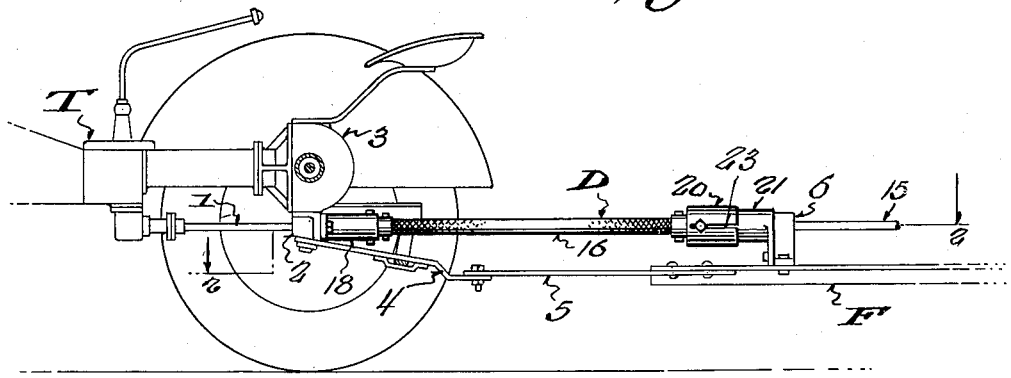
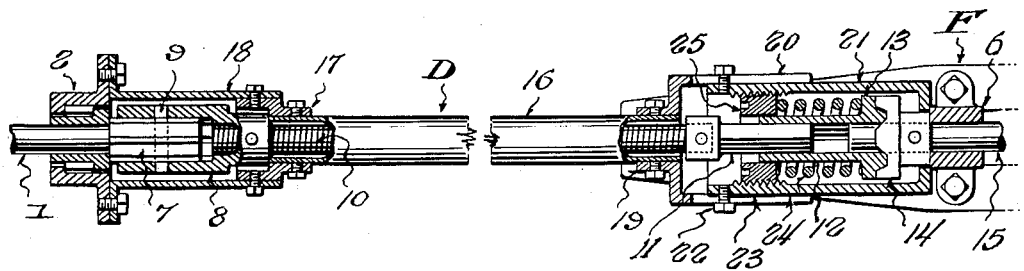

2,626,000

UNITED STATES PATENT OFFICE 2,626,000

FLEXIBLE AND OVERLOAD RELEASABLE DRIVE MECHANISM BETWEEN DRAW-BAR CONNECTED VEHICLES

Chester M. Yergens, Milwaukee, Wis.

Application June 10, 1950, Serial No. 167,423

2 Claims. (Cl. 180—14)

This invention pertains generally to a drive mechanism, and more particularly to a flexible driving connection between a tractor power take-off shaft and the drive shaft of an implement.

Conventional flexible drive connections now in use consist of rigid or splined telescoping shafts connected to the tractor power take-off shaft and implement drive shaft by universal joints. When exposed the universal joints and telescoping shafts present a serious hazard, due to the fact that unless the operator uses extreme caution in stepping down from the tractor, the protruding universal joints and exposed revolving shafts frequently become entangled in his garments, resulting in serious bodily injury.

To overcome the foregoing, fixed hood guards have been devised to cover the drive mechanism, but inasmuch as these are usually opened at the bottom the crop often becomes entangled in the drive mechanism, making it necessary to untangle the same, which requires a tedious operation and loss of time in removing and replacing the guard. Consequently, operators often are carelessly inclined to leave the guard off.

Therefore, the present invention has primarily for its purpose to overcome the foregoing objections by the provision of a flexible drive connection between the tractor and implement, in which no revolving parts are exposed, thus eliminating danger to the operator and entanglement of the crop.

Incidental to the foregoing, a more specific object of the invention is to provide a drive connection utilizing a flexible shaft completely housed within a stationary flexible tubular casing, and elimination of universal joints.

A still further object is to provide the present drive connection with a clutch to release the same upon predetermined torque strain, thus preventing damage to both the drive and implement, should the latter become clogged.

In addition to the foregoing, other objects will appear as the description proceeds, and while the accompanying drawing illustrates one complete physical form of the invention constructed in accordance with the best mode so far devised, it is to be understood that changes in the precise embodiment of the invention are contemplated within the scope of the appended claims.

In the drawing:

Figure 1 is an elevational view of a drive mechanism incorporating principles of the present invention, the same being shown applied to a conventional tractor power take-off and implement drive shaft, both of which are illustrated in light lines and form no part of the present invention; and Figure 2 is an enlarged longitudinal plan sectional view of the drive mechanism taken on the line 2—2 of Figure 1.

Referring now more particularly to the accompanying drawing, T indicates the rear end of a conventional tractor provided with a power take-off shaft 1, journaled in a bearing 2 secured to the lower face of the tractor differential housing 3. A draw bar 4 attached to the bearing 2 is connected to a tongue 5 extending from an implement frame F.

The present drive mechanism D is attached at one end to the tractor T, and at the other end to a bearing 6 carried by the implement frame F, which provides a journal for the implement drive shaft 15.

As best shown in Figure 2, the end of the power take-off shaft 1, journaled at its rear end in the bearing 2, is provided with a spline extension 7 for reception of a sleeve 8, fast against longitudinal movement on the spline by a pin 9. Secured within the reduced rear end of the sleeve 8 is a flexible drive shaft 10, which may be of either the spiral wound type illustrated, or a conventional link-shaft.

Secured upon the rear end of the flexible drive shaft 10 is a squared shank 11, splined within a sleeve 12 for longitudinal movement. The rear end of the sleeve 12 is provided with a toothed clutch head 13, normally engaging a complementary head 14 secured on the implement drive shaft 15, which projects through the head 13 to hold the same in longitudinal alignment with the head 14.

Surrounding the flexible drive shaft 10 is a flexible tubular casing 16, which may be of conventional metallic, reinforced fabric or rubber construction. The forward end of the casing 16 is secured within a collar 17, which in turn is fastened within the end of a housing 18 attached to the rear face of the bearing 2 and surrounding the sleeve 8 attached to the spline end 7 of the tractor power take-off shaft 1.

The rear end of the flexible casing 16 is secured within an annular flange 19 formed on one end of a tubular shell 20, slidably mounted on a cylindrical housing 21 attached to the bearing 6 carried by the implement frame F. The shell 20 is held against rotation on the housing 21 by bolts 22 extending through longitudinal slots 23 formed in the shell.

A coil spring 24 interposed between the clutch head 13 and a spanner nut 25, threaded into the interior of the annular housing 21, serves to hold the clutch head 13 into engagement with the complementary clutch head 14, and obviously, in the event of excessive torque strain on the drive, the clutch head 13 is free to shift out of operative engagement with the head 14, against predetermined pressure of the spring 24, which may be regulated by adjustment of the spanner nut 25.

In operation, it will be apparent that flexibility of the shaft 10 and casing 16 permits free relative turning action between the tractor and implement, and consequent variation in the distance between the tractor bearing 2 and implement bearing 6 will be compensated for by the spline connection between the shank 11 and the splined sleeve 12. At the same time the slidable connection between the shell 20 and the housing 21 allows corresponding longitudinal movement of the flexible casing 16.

From the foregoing explanation, considered in connection with the accompanied drawing, it will be readily seen that an effective flexible drive connection for use between a tractor and implement has been devised, in which no rotatable parts are exposed to endanger the operator, or entangle the crop.

While not essential to the fundamental principle of the present invention, the torque release clutch provided is considered highly advantageous, particularly in the present application, for the purpose of eliminating possible damage to the flexible drive shaft in the event of excessive torque strain should the implement become fouled.

I claim:

1. A flexible releasable drive mechanism for use between a tractor power take-off shaft and the drive shaft of a draw-bar connected implement comprising, a flexible drive shaft, operative connections between said flexible drive shaft and the tractor power take-off shaft and the implement drive shaft, one of said connections including a spline to allow relative axial movement between the flexible drive shaft and adjacent connected shaft, a spring clutch interposed between one end of said flexible drive shaft and adjacent connected shaft to operatively release said flexible shaft upon predetermined torsional strain, a flexible non-rotatable tubular casing surrounding said flexible drive shaft, a rigid connection between one end of said tubular casing and either said tractor or implement, and a slidable connection between the opposite end of said tubular casing and said tractor or implement to allow free relative longitudinal movement between said non-rotatable casing and tractor or implement to compensate for relative axial movement between said flexible drive shaft and adjacent connected shaft.

2. A flexible releasable drive mechanism for use between a tractor power take-off shaft and the drive shaft of a draw-bar connected implement comprising, a flexible drive shaft, operative connections between said flexible drive shaft and the tractor power take-off shaft and the implement drive shaft, one of said end connections including a spline to allow relative axial movement between said flexible shaft and adjacent connected shaft, a spring clutch interposed between one end of said flexible shaft and adjacent connected shaft to operatively release said flexible shaft upon predetermined torsional strain, stationary housings encasing the ends of said tractor power take-off shaft and said implement drive shaft, a flexible non-rotatable tubular casing surrounding said flexible shaft, a rigid connection between one end of said tubular casing and one of said housings, and a slidable connection between the opposite end of said tubular casing and the other of said housings to allow free relative longitudinal movement between said non-rotatable casing and said housing to compensate for relative axial movement between said flexible drive shaft and adjacent connected shaft.

CHESTER M. YERGENS.

REFERENCES CITED

The following references are of record in the file of this patent:

UNITED STATES PATENTS

| Number | Name | Date |
| --- | --- | --- |
| 1,138,926 | Bernett | May 11, 1915 |
| 1,769,510 | Herman | July 1, 1930 |
| 1,771,703 | Berill | July 29, 1930 |
| 2,030,511 | Gruber | Feb. 11, 1936 |
| 2,275,004 | Behl | Mar. 3, 1942 |
| 2,390,908 | Young | Dec. 11, 1945 |
| 2,517,721 | Schleper | Aug. 8, 1950 |